United States Patent
Zhou (10) Patent No.: US 12,058,533 B2
(45) Date of Patent: Aug. 6, 2024

(54) METHOD AND DEVICE FOR DETERMINING OCCUPIED SLOTS, STORAGE MEDIUM, AND USER EQUIPMENT

(71) Applicant: BEIJING UNISOC COMMUNICATIONS TECHNOLOGY CO., LTD., Beijing (CN)

(72) Inventor: Huan Zhou, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 520 days.

(21) Appl. No.: 17/415,207

(22) PCT Filed: Nov. 15, 2019

(86) PCT No.: PCT/CN2019/118756
§ 371 (c)(1),
(2) Date: Jun. 17, 2021

(87) PCT Pub. No.: WO2020/125289
PCT Pub. Date: Jun. 25, 2020

(65) Prior Publication Data
US 2022/0022054 A1    Jan. 20, 2022

(30) Foreign Application Priority Data
Dec. 18, 2018 (CN) .......................... 201811552353.7

(51) Int. Cl.
*H04W 16/28* (2009.01)
*H04W 72/0446* (2023.01)
(Continued)

(52) U.S. Cl.
CPC ....... *H04W 16/28* (2013.01); *H04W 72/0446* (2013.01); *H04W 72/0453* (2013.01); *H04W 72/23* (2023.01)

(58) Field of Classification Search
CPC ............. H04W 16/28; H04W 72/0446; H04W 72/0453; H04W 72/23
See application file for complete search history.

(56) References Cited

U.S. PATENT DOCUMENTS

2014/0160968 A1   6/2014   Sahlin et al.
2017/0367046 A1   12/2017   Papasakellariou
(Continued)

FOREIGN PATENT DOCUMENTS

CN   108600974 A   9/2018
CN   108632841 A   10/2018
(Continued)

OTHER PUBLICATIONS

CNIPA First Office Action for corresponding CN Application No. 201811552353.7; Issued on Feb. 23, 2022.
(Continued)

*Primary Examiner* — Huy D Vu
*Assistant Examiner* — Robert Ma
(74) *Attorney, Agent, or Firm* — CANTOR COLBURN LLP (57) ABSTRACT

A method and device for determining occupied slots, a storage medium, and a user equipment. The method comprises: receiving a slot format indication index and a number N of slots indicated by a slot format from a base station by means of a PDCCH, and according to the slot format indication index, determining a starting position in the PDCCH of the slots indicated by the slot format; receiving a number M of spatial directions from the base station, and receiving multiple indication signals transmitted from the M
(Continued)

spatial directions from the base station; determining the M spatial directions according to the indication signals; and in the M spatial directions, determining slots occupied by the base station in each spatial direction according to the starting position in the PDCCH of the slots indicated by the slot format and the number N of the slots indicated by the slot format.

8 Claims, 4 Drawing Sheets

(51) Int. Cl.
*H04W 72/0453* (2023.01)
*H04W 72/23* (2023.01)

(56) References Cited

U.S. PATENT DOCUMENTS

| | | | |
|---|---|---|---|
| 2018/0006696 A1 | 1/2018 | Yue et al. | |
| 2018/0139735 A1* | 5/2018 | Akkarakaran | H04L 5/0053 |
| 2018/0227934 A1 | 8/2018 | Yang et al. | |
| 2020/0092862 A1 | 3/2020 | Tang et al. | |
| 2021/0153162 A1* | 5/2021 | Chen | H04W 56/001 |
| 2022/0053541 A1* | 2/2022 | Lei | H04W 72/23 |

FOREIGN PATENT DOCUMENTS

| | | |
|---|---|---|
| CN | 108702693 A | 10/2018 |
| CN | 108809614 A | 11/2018 |
| CN | 108964853 A | 12/2018 |
| WO | 2017078425 A1 | 5/2017 |
| WO | 2018127370 A1 | 7/2018 |

OTHER PUBLICATIONS

EPO Extended European Search Report for corresponding EP Application No. 19897581.5; Issued Jul. 15, 2022.
Ericsson "Feature lead summary for UL Signals and Channels"; 3GPP TSG RAN WG1 Meeting #95; R1-1813893; Nov. 12-16, 2018; 18 pages.
Huawei "DL channels and signals in NR unlicensed band"; 3GPP TSG RAN WG1 Meeting #94; R1-1808059; Aug. 20-24, 2018; 5 pages.
Huawei "NR numerology and frame structure for unlicensed bands"; 3GPP TSG RAN WG1 Meeting #95; R1-1818903; Nov. 12-16, 2018; 14 pages.
International Search Report for International Application No. PCT/CN2019/118756; Date of Mailing, Jan. 23, 2020.
MediaTek Inc., "Design of GC PDCCH", 3GPP TSG RAN WG1 Meeting AH_NR#3, R1-1716200, Nagoya, Japan, Sep. 18-21, 2017; 6 pages.

* cited by examiner

S41 — in a first spatial direction, determining an ending position of the slots indicated by the slot format in the first spatial direction according to the starting position in the PDCCH of the slots indicated by the slot format and the number N of the slots indicated by the slot format S42 — in a second spatial direction, taking the ending position of the slots indicated by the slot format in the first spatial direction as a starting position of the slots indicated by the slot format in the PDCCH in the second spatial direction, and determining an ending position of the slots indicated by the slot format in the second spatial direction according to the number N of the slots indicated by the slot format S43 — in an M-th spatial direction, taking an ending position of the slots indicated by the slot format in an (M-1)th spatial direction as a starting position of the slots indicated by the slot format in the M-th spatial direction in the PDCCH, and determining an ending position of the slots indicated by the slot format in the M-th spatial direction according to the number N of the slots indicated by the slot format, sequentially, so as to determine slots occupied by the base station in each spatial direction

METHOD AND DEVICE FOR DETERMINING OCCUPIED SLOTS, STORAGE MEDIUM, AND USER EQUIPMENT

CROSS REFERENCE TO RELATED APPLICATIONS

This is the U.S. national stage of application No. PCT/CN2019/118756, filed on Nov. 15, 2019. Priority under 35 U.S.C. § 119(a) and 35 U. S. C. § 365(b) is claimed from Chinese Application No. 201811552353.7, filed Dec. 18, 2018, the disclosure of which is also incorporated herein by reference.

TECHNICAL FIELD

The present disclosure generally relates to communication technology field, and more particularly, to a method and device for determining occupied slots, a storage medium and a user equipment.

BACKGROUND

The 3rd Generation Partnership Project (3GPP) standards organization is studying how to deploy an NR network on an unlicensed spectrum, so as to achieve fair and effective utilization of the unlicensed spectrum and improve data transmission rate of a 5G New Radio (NR) system. The 3GPP Long Term Evolution (LTE) system achieves the coexistence of different operators and other systems in the unlicensed spectrum by performing Listen-Before-Talk (LBT).

Due to different priorities of channel accesses, channel occupation durations are different. In a 3GPP meeting, it was discussed and decided to send a public slot format through a physical downlink control channel (PDCCH) to inform terminals of channel occupation durations, which includes the channel occupation durations and downlink/uplink allocation.

When an Evolved Node B (gNB) adopts LBT in a certain direction and accesses a channel successfully, a User Equipment (UE) may determine channel occupation durations, that is, determine occupied slots, which facilitates the UE and the gNB to share the channel, thereby increasing channel occupancy rate.

However, a beam introduced in the NR system is transmitted in a non-omnidirectional mode, which means a specific beam in a certain direction is often used for transmission. In prior art, the UE cannot know the certain direction of the specific beam of the channel occupied by the base station, so that it is difficult to share the channel with the base station effectively.

SUMMARY

Embodiments of the present disclosure may achieve a better noise reduction effect with a lower resource cost.

In an embodiment of the present disclosure, a method for determining occupied slots is provided, including: receiving a slot format indication index and a number N of slots indicated by a slot format from a base station through a physical downlink control channel (PDCCH), and determining a starting position in the PDCCH of the slots indicated by the slot format according to the slot format indication index; receiving a number M of spatial directions from the base station, where different spatial directions have different spatial reception parameters, and receiving multiple indication signals transmitted from M spatial directions from the base station, where each indication signal corresponds to a spatial direction and has a spatial reception parameter; determining the M spatial directions according to the multiple indication signals; and in the M spatial directions, determining slots occupied by the base station in each spatial direction respectively, according to the starting position in the PDCCH of the slots indicated by the slot format and the number N of the slots indicated by the slot format; and wherein M is a positive integer and N is a positive integer.

Optionally, the slot format indication index includes a slot format indication index in a single spatial direction; and in the M spatial directions, determining slots occupied by the base station in each spatial direction respectively according to the starting position in the PDCCH of the slots indicated by the slot format and the number N of the slots indicated by the slot format includes: in a first spatial direction, determining an ending position of the slots indicated by the slot format in the first spatial direction according to the starting position in the PDCCH of the slots indicated by the slot format and the number N of the slots indicated by the slot format; in a second spatial direction, taking the ending position of the slots indicated by the slot format in the first spatial direction as a starting position of the slots indicated by the slot format in the PDCCH in the second spatial direction, and determining an ending position of the slots indicated by the slot format in the second spatial direction according to the number N of the slots indicated by the slot format; and in an M-th spatial direction, taking an ending position of the slots indicated by the slot format in an (M−1)th spatial direction as a starting position of the slots indicated by the slot format in the M-th spatial direction in the PDCCH, and determining an ending position of the slots indicated by the slot format in the M-th spatial direction according to the number N of the slots indicated by the slot format, sequentially, so as to determine slots occupied by the base station in each spatial direction.

Optionally, the slot format indication index includes slot format indication indexes in the M spatial directions; and in the M spatial directions, determining slots occupied by the base station in each spatial direction respectively according to the starting position in the PDCCH of the slots indicated by the slot format and the number N of the slots indicated by the slot format includes: in the M spatial directions, according to the starting position in the PDCCH of the slots indicated by the slot format and the number N of the slots indicated by the slot format, determining an ending position of the slots indicated by the slot format in each spatial direction, so as to determine slots occupied by the base station in each spatial direction.

Optionally, the indication signals include downlink reference signals or Single Side Band (SSB) signals.

Optionally, the method for determining occupied slots further includes: determining frequency domain resources of one or more following signals as frequency domain resources occupied by the base station in each spatial direction: the PDCCH, a Physical Downlink Shared Channel (PDSCH) scheduled by the PDCCH and the indication signals.

Optionally, determining the M spatial directions according to the multiple indication signals includes: receiving a high-level signaling from the base station, where the high-level signaling indicates a corresponding relationship between each indication signal and the multiple indication signals; and determining the M spatial directions according to the multiple indication signals and the corresponding relationship.

Optionally, a number of the multiple indication signals is M, and determining the M spatial directions according to the multiple indication signals includes: receiving a high-level signaling from the base station, where the high-level signaling indicates a one-to-one corresponding relationship between each indication signal and each indication signal; and determining the M spatial directions according to the multiple indication signals and the one-to-one corresponding relationship.

In an embodiment of the present disclosure, a device for determining occupied slots is provided, including: an index receiving module, adapted to receive a slot format indication index and a number N of slots indicated by a slot format from a base station through a PDCCH, and determine a starting position in the PDCCH of the slots indicated by the slot format according to the slot format indication index; an indication signal receiving module, adapted to receive a number M of spatial directions from the base station, where different spatial directions have different spatial reception parameters; and to receive multiple indication signals transmitted from M spatial directions from the base station, where each indication signal corresponds to a spatial direction and has a spatial reception parameter; a spatial direction determination module, adapted to determine the M spatial directions are according to the multiple indication signals; and a slot determination module, adapted to, in the M spatial directions, determine slots occupied by the base station in each spatial direction separately according to the starting position in the PDCCH of the slots indicated by the slot format and the number N of the slots indicated by the slot format; and wherein M is a positive integer and N is a positive integer.

In an embodiment of the present disclosure, a storage medium having computer instructions stored therein is provided, wherein once the computer instructions are executed, the above method for determining occupied slots is performed.

In an embodiment of the present disclosure, a user equipment including a memory and a processor is provided, wherein the memory has computer instructions stored therein, and when the processor executes the computer instructions, the above method for determining occupied slots is performed.

Embodiments of the present disclosure may provide following advantages.

In embodiments of the present disclosure, by setting a number M of spatial directions sent by the base station and multiple indication signals sent from the M spatial directions, the UE can determine the M spatial directions according to the indication signals, and then determine slots occupied by the base station in each spatial direction. However, in the prior art, the UE cannot know the beam directions of channels occupied by the base station. According to the embodiments of the present disclosure, the UE can share the channels with the base station more effectively.

Further, in the embodiments of the present disclosure, the UE may determine the slots occupied by the base station in each spatial direction in different ways, thereby helping users to select according to specific conditions and improving convenience for the users.

Further, in the embodiments of the present disclosure, by setting the number of the indication signals to be M and by using the high-level signaling to indicate the one-to-one corresponding relationship between each indication signal and each spatial direction, the UE can accurately determine the beam directions of the channels occupied by the base station, thereby sharing the channels with the base station more effectively.

DETAILED DESCRIPTION

As described in the background, when a gNB adopts LBT in a certain direction and accesses a channel successfully, a UE may determine channel occupation durations, that is, determine occupied slots, which facilitates the UE and the gNB to share the channel, thereby increasing channel occupancy rate.

Specifically, in a 3GPP NR system, if radio frames have a time domain duration of 10 ms, each radio frame is divided into 10 subframes of a same size with a time domain duration of 1 ms, and each subframe may include multiple slots due to different subcarrier intervals. Each slot includes a certain number of symbols, and the number of symbols is determined according to a type of Cyclic Prefix (CP).

Compared with LTE's special subframe structure which has a fixed number of 10 downlink, GP and uplink symbols, the NR introduces a Slot Format (SF), which includes numbers of downlink, flexible (denoted by X) and uplink symbols in a certain slot. SF may include three configuration modes: semi-static cell-level Radio Resource Control (RRC) signaling configuration mode, UE-specific RRC signaling configuration mode and Dynamic Slot Format Indication (SFI) information configuration mode.

Specifically, in the Dynamic SFI configuration mode, a PDCCH is used to dynamically send a SFI information to a plurality of UEs. A Downlink Control Information (DCI) format is named as DCI Format 2-0. The SFI information carried in the PDCCH may indicate formats of one or more slots on one or more carriers, which is called a slot format combination set. A position of the slot format combination set in the DCI is configured through a high-level signaling. Therefore, after receiving the slot format combination set, the UE obtains an index information which points to a UE-specific table, thereby learning which symbols in the slot are "Uplink (UL)", which symbols are "Downlink (DL)", Which symbols are flexible. Specifically, the UE-specific table may be configured and combined from a single-slot-format table. The single-slot-format table includes all slot formats (less than 256) which can be supported in the NR system.

The 3GPP Long Term Evolution (LTE) system achieves the coexistence of different operators and other systems in the unlicensed spectrum by performing a LBT process. The LBT process means that in the unlicensed spectrum, nodes determine whether a current channel (by taking 20 MHz as unit) is available through a clear channel assessment (CCA) before transmitting data.

Further, each LBT process includes energy detection to determine whether the channel is occupied. Some regional laws and regulations stipulate an energy detection threshold. If energy received by a node is higher than the energy detection threshold, the channel is considered to be busy. Two channel access processes are supported in a downlink transmission of Licensed-assisted Access Using LTE (LAA-LTE): one is to send a physical uplink shared channel (PUSCH)/a physical downlink control channel (PDCCH)/an enhanced physical downlink control channel (EPDCCH) (also known as Cat 4 channel access), and the other is to send a discovery reference signal (also known as Cat 2 channel access); similarly, LAA uplink transmission also supports the two channel access processes, which are known as Type 1 channel access and Type 2 channel access.

Specifically, Type 1 channel access is based on Cat 4 channel access, and Type 2 channel access is based on Cat 2 channel access having a fixed time duration (in which LBT is performed for at least 25 us before transmission).

Type 1 channel access: a channel is detected to determine if it is idle during a defer duration $T_d$, the value of N in Step 4 is 0, and N increases with a sensing slot duration. Steps in Type 1 channel access process are described as follows:
Step 1: set $N=N_{init}$, where $n_{init}$ is a random number uniformly distributed between 0 and $CW_p$.
Step 2: if N>0 and eNB/gNB chooses to decrement a counter, set N=N−1.
Step 3: sense the channel for an additional sensing slot duration, and if the additional sensing slot duration is idle, go to step 4; otherwise, go to step 5.
Step 4: if N=0, stop; otherwise, go to Step 2.
Step 5: sense the channel for an additional defer duration $T_d$ until either a busy sensing slot is detected within the additional defer duration $T_d$ or all sensing slots of the additional defer duration $T_d$ are detected to be idle.
Step 6: if the channel is sensed to be idle during all the sensing slot durations of the additional defer duration $T_d$, go to step 2; otherwise, go to step 5.

In the channel access process described above, different Maximum Channel Occupy Time (MCOT) is required according to different channel access priorities. The MCOT which means a maximum available time period of the channel, is shown as $T_{mcot,p}$ in Table 1.

TABLE 1

| Channel Access Priority Class (p) | m_p | CW_minp | CW_maxp | T_mcotp | allowed CW_p sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Type 2 channel access: if the channel is detected for at least $T_{drs}$=25 us, average energy is lower than $X_{Thresh}$, and transmission time is less than 1 ms, downlink or uplink data can be sent on a channel transmitted by an unlicensed cell.

It can be seen that different channel accesses have different priority levels, resulting in different channel occupation durations. In the 3GPP meeting, it was discussed and decided to send a public slot format through a PDCCH to inform terminals of channel occupation durations, which includes the channel occupation durations and downlink/uplink allocation.

Inventors of the present disclosure discovered that, in NR, transmission mode of an introduced beam is non-omnidirectional, which is usually transmitted through a specific beam in a certain direction. In the prior art, the UE cannot know a beam direction of a channel occupied by the base station, result in difficulty in sharing the channel with the base station effectively.

Specifically, the transmission mode of an introduced beam in NR is non-omnidirectional, which is usually transmitted through a specific beam in a certain direction. More specifically, in order to support beam transmission, processes such as beam management, beam indication and beam recovery are included in NR. Agreements stipulate that Transmission Configuration Indication (TCI) is used to indicate characteristics of downlink transmission, such as Doppler frequency shift, Doppler spread, average delay, delay spread and spatial reception parameters. A UE may configure up to M TCI-states to indicate a PDCCH to schedule a Physical Downlink Shared Channel (PDSCH) transmission state, where M depends on capabilities of the UE. Each TCI-State includes a quasi co-location (QCL) relationship between a PDSCH Demodulation Reference Signal (DMRS) and one or two reference signals. A type of the quasi co-location of the PDCCH DMRS and the one or two reference signals is configured through a high-level signaling and then activated by a MAC signaling. A Channel State Information Reference Signal (CSI-RS) can be configured with a quasi co-location type of a CSI-RS signal or a Single Side Band (SSB) signal.

Specifically, quasi co-location types may include following ones:
'QCL-TypeA': {Doppler shift, Doppler spread, average delay, delay spread};
'QCL-TypeB': {Doppler shift, Doppler spread};
'QCL-TypeC': {Doppler shift, Doppler extension average delay}
'QCL-TypeD': {Spatial Rx parameter}.

In an uplink channel or signal transmission, the UE is informed of an uplink beam direction to be used by configuring or instructing a Spatial Relation Information. For example, a Spatial Relation Information of a periodic sounding reference signal (SRS) may include: an SSB index, which means the UE sends the SRS through a same spatial transmission filter as receiving an SSB; or a CSI-RS index, which means the UE sends the SRS through a same spatial transmission filter as receiving a CSI-RS; or an SRS index, which means the UE sends the SRS through a same spatial transmission filter as sending a reference SRS.

The inventors of the present disclosure further discovered that in the unlicensed spectrum, after adopting LBT in a certain direction and accessing the channel successfully, the base station needs to notify the UE of the beam direction of the occupied channel, in addition to the channel occupation duration, which facilitates to share channels with the UE effectively, thereby increasing channel occupancy rate and improving system performance.

In embodiments of the present disclosure, by setting a number M of spatial directions sent by the base station and multiple indication signals sent from the M spatial directions, the UE can determine the M spatial directions according to the indication signals, and then determine slots occupied by the base station in each spatial direction. However, in the prior art, the UE cannot know the beam directions of channels occupied by the base station. According to the embodiments of the present disclosure, the UE can share the channels with the base station more effectively.

In order to clarify the object, characteristic and advantages of embodiments of the present disclosure, embodiments of present disclosure will be described clearly in detail in conjunction with accompanying drawings.

Figure 1:
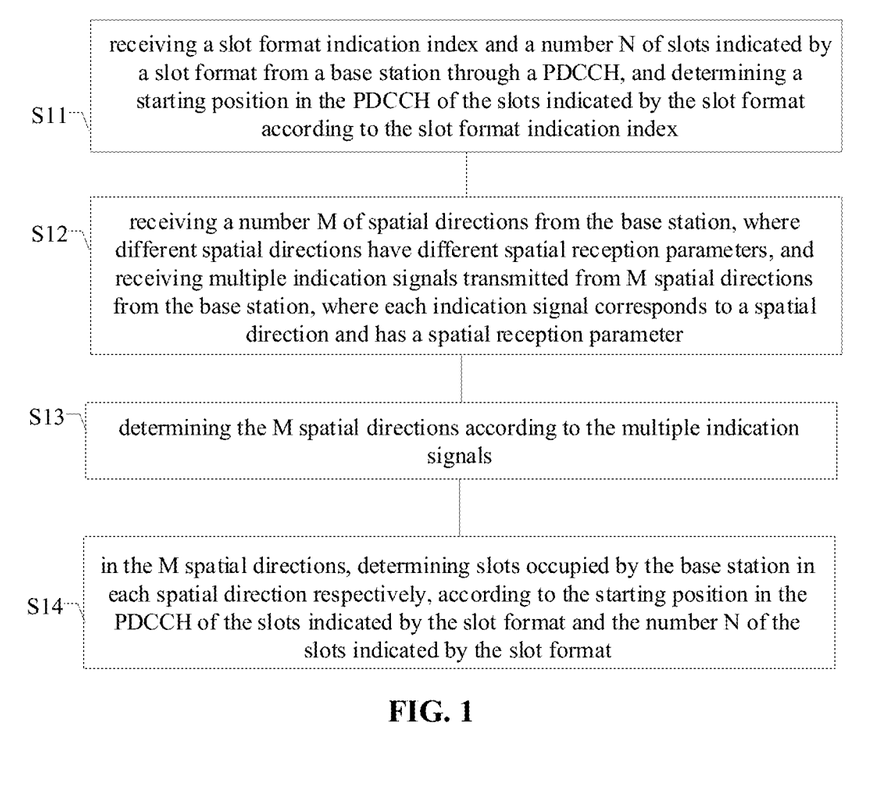
FIG. 1 schematically illustrates a flow chart of a method for determining occupied slots according to an embodiment.

FIG. 1 schematically illustrates a flow chart of a method for determining occupied slots according to an embodiment. Referring to FIG. 1, the method for determining occupied slots includes S11 to S14.

In S11, a slot format indicating index and a number N of slots indicated by a slot format is received from a base station through a PDCCH, and a starting position in the PDCCH of the slots indicated by the slot format is determined according to the slot format indicating index.

In S12, a number M of spatial directions is received from the base station, where different spatial directions have different spatial reception parameters; and multiple indication signals transmitted from M spatial directions are received from the base station, where each indication signal corresponds to a spatial direction and has a spatial reception parameter.

In S13, the M spatial directions are determined according to the multiple indication signals.

In S14, in the M spatial directions, the slots occupied by the base station in each spatial direction are respectively determined according to the starting position in the PDCCH of the slots indicated by the slot format and the number N of slots indicated by the slot format.

Specifically, M is a positive integer and N is a positive integer.

Specifically, in S11, the slot format indicating index and the number N are configured by the base station, and are received by a UE from the base station through the PDCCH.

In one embodiment, the dynamic slot format information configuration mode means the base station dynamically sends a slot format indication (SFI) index to a plurality of UEs through the PDCCH, and the DCI format is referred to as DCI format 2-0.

It should be noted that after receiving the SFI information, the UE may determine the starting position in the PDCCH of the slots indicated by the slot format according to the SFI information. In the embodiments of the present disclosure, how the UE determines the starting position is not elaborated, which should not limit the scope of the present disclosure.

Further, the UE may determine an end position of the slots indicated by the slot format in the PDCCH according to the starting position and the number N of the slots indicated by the slot format.

In one embodiment, in S11, the UE receives the number M of spatial directions and the multiple indication signals transmitted from the M spatial directions from the base station.

Specifically, different spatial directions have different spatial reception parameters, and each indication signal corresponds to a spatial direction and has a spatial reception parameter.

Specifically, downlink or uplink transmissions allowed within a channel occupation duration have a same spatial characteristic, in other words, a same spatial reception parameter.

More specifically, only a specific TCI type D downlink transmission is allowed during a downlink transmission duration, and the UE only needs to receive downlink signals or channels with QCL-TypeD. The UE does not receive downlink signals or channels with different QCL-TypeD.

Only uplink transmission of a specific space-related information is allowed within an uplink transmission duration, and the UE can only send uplink signals or channels with the specific space-related information within the uplink transmission duration. The UE cannot send uplink signals or channels with other space-related information within the uplink transmission duration.

Further, the indication signals may include: downlink reference signals or an SSB signals.

In one embodiment, the downlink reference signal may include a CSI-RS signal.

Further, taking the number M equal to 2 as an example, that is, the number of spatial directions received by the UE from the base station is two, and a CSI-RS 1 signal and a CSI-RS 2 signal sent from the two spatial directions are received from the base station.

In an embodiment, in S13, the UE may determine the M spatial directions according to the indication signals.

Figure 2:
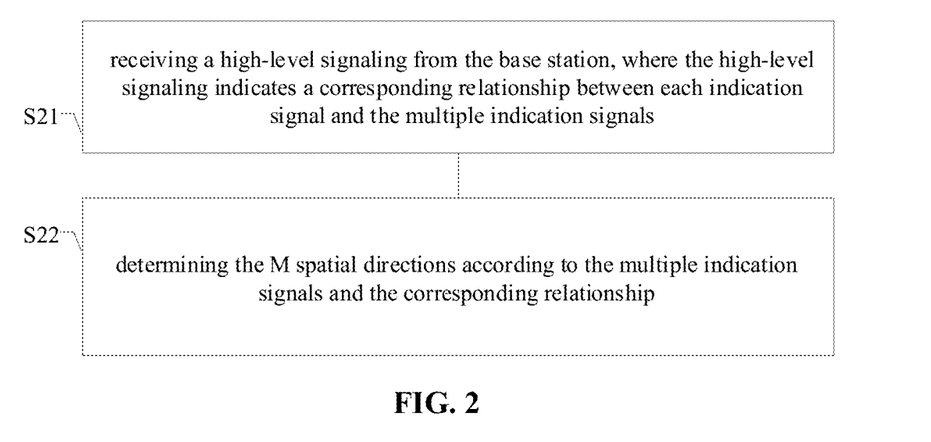
FIG. 2 schematically illustrates a flow chart of S13 in FIG. 1 according to an embodiment.

Referring to FIG. 2, FIG. 2 schematically illustrates a flow chart of S13 in FIG. 1 according to an embodiment. The method of determining the M spatial directions according to the indication signals may include S21 to S22, which will be described in detail below.

In S21, the UE may receive a high-level signaling from the base station, where the high-level signaling indicates a corresponding relationship between the indication signals and the spatial directions.

In an embodiment, the high-level signaling may be a RRC signaling.

In S22, the UE may determine the M spatial directions according to the indication signals and the corresponding relationship.

It should be noted that in the embodiments of the present disclosure, a number of the indication signals may not be limited. For example, multiple indication signals may correspond to one spatial direction, thereby reducing the limitation on the indication signals.

In the embodiments of the present disclosure, by using the high-level signaling to indicate the corresponding relationship between the indication signals and the spatial directions, the UE can accurately determine the beam directions of the channels occupied by the base station, thereby sharing the channels with the base station more effectively.

Figure 3:
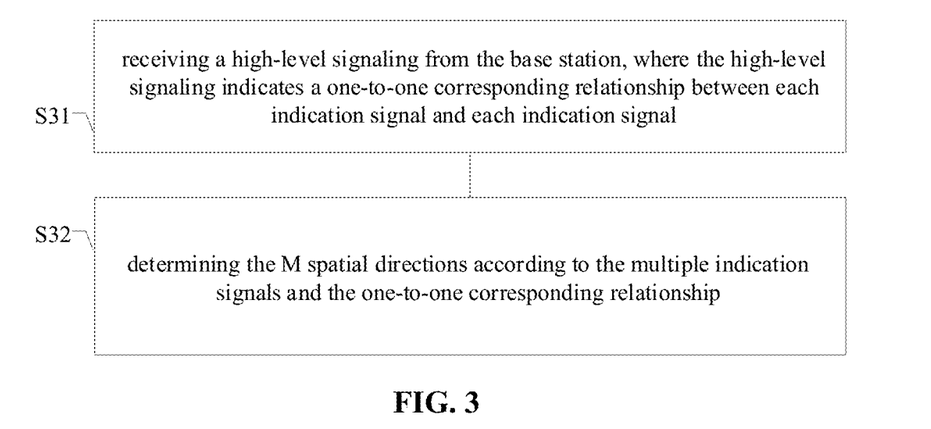
FIG. 3 schematically illustrates a flow chart of S13 in FIG. 1 according to another embodiment.

Referring to FIG. 3, FIG. 3 schematically illustrates a flow chart of S13 in FIG. 1 according to another embodiment.

The method of determining the M spatial directions according to the indication signals may include S31 to S32, which will be described in detail below.

In S31, the UE may receive a high-level signaling from the base station, where the high-level signaling indicates a one-to-one corresponding relationship between each indication signal and each spatial direction.

In an embodiment, the high-level signaling may be a RRC signaling.

In S32, the M spatial directions are determined according to the indication signals and the one-to-one corresponding relationship.

In the embodiments of the present disclosure, by setting the number of the indication signals to be M and by using the high-level signaling to indicate the one-to-one corresponding relationship between each indication signal and each spatial direction, the UE can accurately determine the beam directions of the channels occupied by the base station, thereby sharing the channels with the base station more effectively.

Those skilled in the art can understand that, compared with the method in which the number of indication signals is not specified, it is easier to indicate and determine the corresponding relationship between each indication signal and the spatial directions by setting the number of indication signals to be M, which facilitates to save signaling resources of the high-level signaling.

Referring to FIG. 1, in a specific implementation of S14, in the M spatial directions, the UE, according to the starting position in the PDCCH of the slots indicated by the slot format and the number N of the slots indicated by the slot format, determines slots occupied by the base station in each spatial direction, respectively.

In an embodiment, the UE may obtain M sets of slot format combinations according to the slot format indication index carried by the PDCCH, where each set of slot format combinations corresponds to a channel-occupancy situation in a spatial direction. The UE may determine whether to perform downlink reception or uplink transmission in the spatial direction.

For example, if the UE obtains 2 sets of slot format combinations according to the slot format indication index in M directions, where a first set of slot format combinations is a channel-occupancy situation when the UE receives a CSI-RS 1 signal with a corresponding spatial characteristic. The UE may determine whether to perform downlink reception or uplink transmission in the spatial direction.

Figure 4:
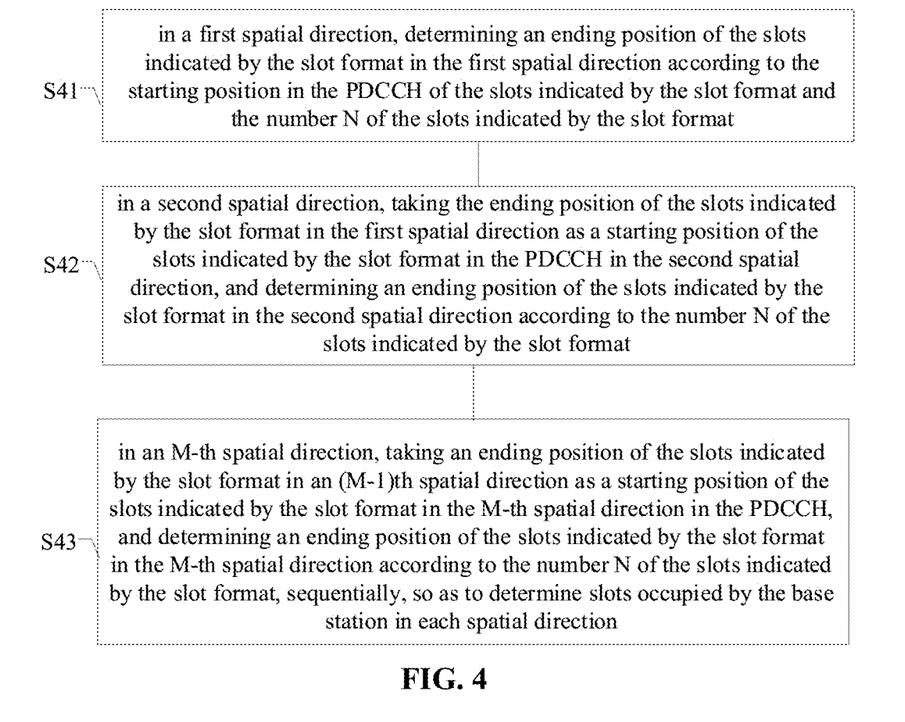
FIG. 4 schematically illustrates a flow chart of S14 in FIG. 1 according to an embodiment.

Referring to FIG. 4, FIG. 4 schematically illustrates a flow chart of S14 in FIG. 1 according to an embodiment. The method of in the M spatial directions, determining the slots occupied by the base station in each spatial direction according to the starting position in the PDCCH of the slots indicated by the slot format and the number N of slots indicated by the slot format may include S41 to S43, which will be described in detail below.

In an embodiment, in S41, in a first spatial direction, according to the starting position in the PDCCH of the slots indicated by the slot format and the number N of the slots indicated by the slot format, an ending position of the slots indicated by the slot format in the first spatial direction may be determined.

In an embodiment, in S42, in a second spatial direction, the ending position of the slots indicated by the slot format in the first spatial direction is used as a starting position of the slots indicated by the slot format in the PDCCH in the second spatial direction, and according to the number N of the slots indicated by the slot format, an ending position of the slots indicated by the slot format in the second spatial direction is determined.

In an embodiment, in S43, in an M-th spatial direction, an ending position of the slots indicated by the slot format in an (M−1)th spatial direction is used as a starting position of the slots indicated by the slot format in the M-th spatial direction in the PDCCH, and an ending position of the slots indicated by the slot format in the M-th spatial direction is determined according to the number N of the slots indicated by the slot format, sequentially, so that slots occupied by the base station in each spatial direction may be determined.

In an embodiment, the slot format indication index may be a slot format indication index in a single spatial direction.

In an embodiment, the step of indicating the starting position in the PDCCH of the slots indicated by the slot format may be performed by a high-level signaling.

In an embodiment, the high-level signaling may be a RRC signaling.

According to the embodiments of the present disclosure, the UE can determine the ending position of the slots indicated by the slot format in the first spatial direction according to the starting position of the slots indicated by the slot format in the first spatial direction, and then determine starting positions and ending positions of the slots indicated by the slot format in each spatial direction, sequentially, which facilitates to save signalings, compared with the method of the base station notifying the UE of starting positions and ending positions of the slots indicated by the slot format in each spatial direction through signalings.

Figure 5:
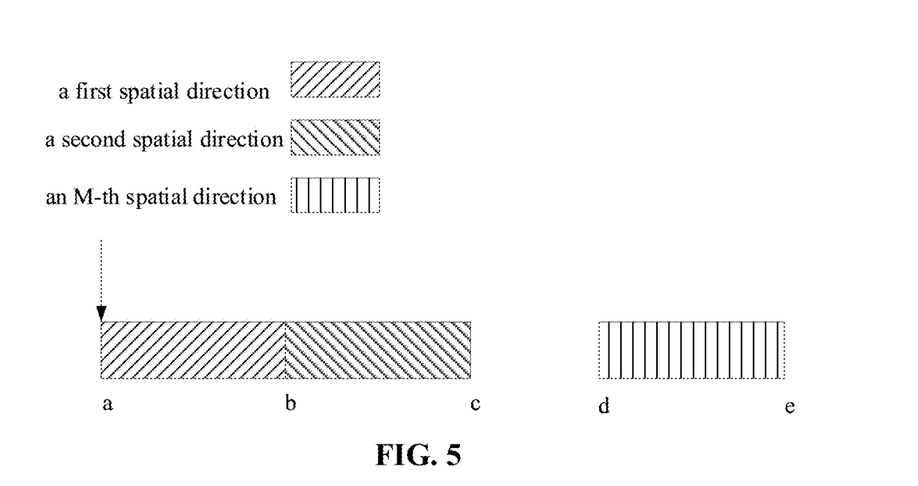
FIG. 5 schematically illustrates a working scenario for indicating a starting position in a PDCCH of slots indicated by a slot format according to an embodiment.

FIG. 5 schematically illustrates a working scenario for indicating a starting position in a PDCCH of slots indicated by a slot format according to an embodiment.

As shown by an arrow in FIG. 5, a high-level signaling is only used to indicate a starting position in a PDCCH of slots indicated by a slot format in a first spatial direction, and the UE needs to determine other positions by itself.

In an embodiment, in a first spatial direction, the UE determines an ending position b according to a starting position a and a number N of the slots indicated by the slot format; next, the UE uses the ending position b as a starting position b in a second spatial direction and determines an ending position c according to the position b and the number N of the slots indicated by the slot format; and sequentially, the UE determines starting positions and ending positions in other spatial directions, until an ending position e of the slots indicated by the slot format in an M-th spatial direction is determined by taking an ending position of the slots indicated by the slot format in the (M−1)th spatial direction as a starting position d in the PDCCH of the slots indicated by the slot format in the M-th spatial direction and according to the number N of the slots indicated by the slot format.

According to the embodiments of the present disclosure, the UE can determine the ending position of the slots indicated by the slot format in the first spatial direction according to the starting position of the slots indicated by the slot format in the first spatial direction, and then determine starting positions and ending positions of the slots indicated by the slot format in each spatial direction, sequentially, which facilitates to save signalings, compared with the method of the base station notifying the UE of starting positions and ending positions of the slots indicated by the slot format in each spatial direction through signalings.

In another embodiment, S14 in FIG. 1 may be performed in a different way. The step of in the M spatial directions, determining the slots occupied by the base station in each spatial direction according to the starting position in the PDCCH of the slots indicated by the slot format and the number N of slots indicated by the slot format may include the following steps: in the M spatial directions, according to the starting position in the PDCCH of the slots indicated by the slot format and the number N of the slots indicated by the slot format, determining ending positions of the slots indicated by the slot format in each spatial direction, so as to determine slots occupied by the base station in each spatial direction.

In another embodiment, the slot format indication index may include multiple slot format indication indexes in M spatial directions.

Figure 6:
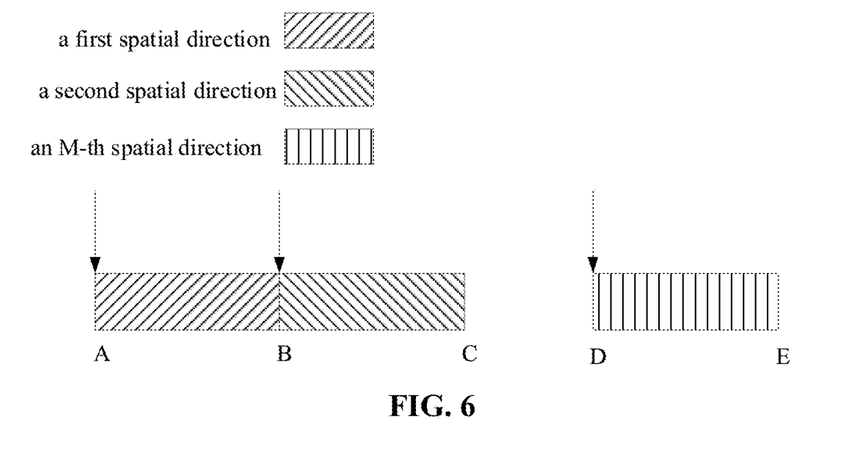
FIG. 6 schematically illustrates a working scenario for indicating starting positions in a PDCCH of slots indicated by a slot format according to another embodiment.

FIG. 6 schematically illustrates a working scenario for indicating starting positions in a PDCCH of slots indicated by a slot format according to another embodiment.

As shown by arrows in FIG. 6, a high-level signaling may be used to indicate starting positions of the slots indicated by the slot format in the PDCCH in each spatial direction, and the UE may determine an ending position according to a corresponding starting position in each spatial direction.

For example, in each spatial direction, the UE determines an ending position B (C, E) according to a starting position A (B, D) and the number N of the slots indicated by the slot format, thereby determining slots occupied by the base station in each spatial direction.

According to the embodiments of the present disclosure, the UE can only determine the ending position of the slots indicated by the slot format in each spatial direction according to the corresponding starting position of the slots indicated by the slot format in each spatial direction, which is helpful to improve computing efficiency.

In summary, in the embodiments of the present disclosure, the UE may determine the slots occupied by the base station in each spatial direction in different ways, thereby helping users to select according to specific conditions and improving convenience for the users.

In an embodiment, the method for determining occupied slots may further include: determining frequency domain resources of one or more of the following signals as frequency domain resources occupied by the base station in each spatial direction: the PDCCH, a PDSCH scheduled by the PDCCH and the indication signals, wherein the indication signals may be downlink reference signals or SSB signals.

Specifically, the UE may determine a subband occupied by a downlink channel by using a received downlink signal or channel and by using the frequency domain resources of the received downlink signal or channel as the frequency domain resources occupied by the base station in each spatial direction, which does not need an extra DCI 2-0 instruction.

More specifically, when the UE monitors one or more PDCCHs and/or PDSCHs and/or downlink reference signals, subbands in which all the one or more downlink reference signals and/or channels are located are the subbands occupied by all downlink channels, and the UE may obtain a channel occupancy information in time-frequency domain according to a channel occupancy information in time domain notified in a DCI 2-0 and the subbands (in frequency domain) channel occupancy information.

In an embodiment, when the UE monitors one or more PDCCHs, subbands in which all the one or more PDCCHs are located are the subbands occupied by all downlink channels. The UE may obtain a channel occupancy information in time-frequency domain according to a channel occupancy information in time domain notified in the DCI 2-0 and the subbands (in frequency Domain) channel occupancy information.

In another embodiment, when the UE monitors one or more PDSCHs, subbands in which all the one or more PDSCHs are located are the subbands occupied by all downlink channels. The UE may obtain a channel occupancy information in time-frequency domain according to a channel occupancy information in time domain notified in the DCI 2-0 and the subbands (in frequency Domain) channel occupancy information.

In another embodiment, when the UE monitors one or more indication signals, subbands in which all the indication signals are the subbands occupied by all downlink channels. The UE may obtain a channel occupancy information in time-frequency domain according to a channel occupancy information in time domain notified in the DCI 2-0 and the subbands (in frequency Domain) channel occupancy information.

According to the embodiments of the present disclosure, the UE may implicitly obtain the subbands occupied by the downlink channels through the received downlink signals and/or channels, without the need for an additional indication of DCI 2-0, which does not need an extra DCI 2-0 instruction and facilitates to save signaling overhead.

According to the embodiments of the present disclosure, by setting the number M of spatial directions sent by the base station and the multiple indication signals sent from the M spatial directions, the UE can determine the M spatial directions according to the indication signals, and then determine the slots occupied by the base station in each spatial direction. However, in the prior art, the UE cannot know the beam directions of channels occupied by the base station. Therefore, the UE can share the channels with the base station more effectively according to the embodiments of the present disclosure.

Figure 7:
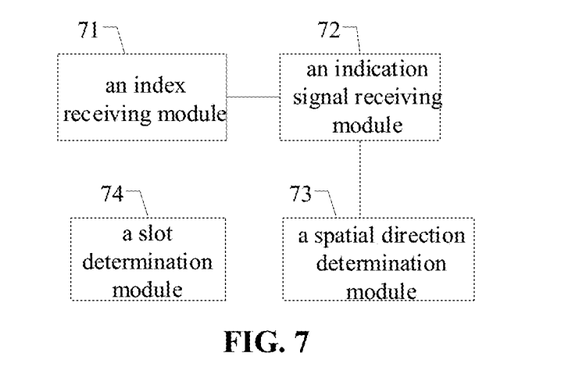
FIG. 7 schematically illustrates a structural diagram of a device for determining occupied slots according to an embodiment.

FIG. 7 schematically illustrates a structural diagram of a device for determining occupied slots according to an embodiment. Referring to FIG. 7, the device for determining occupied slots includes:

an index receiving module 71, adapted to receive a slot format indication index and a number N of slots indicated by a slot format from a base station through a PDCCH, and determine a starting position in the PDCCH of the slots indicated by the slot format according to the slot format indication index;

an indication signal receiving module 72, adapted to receive a number M of spatial directions from the base station, where different spatial directions have different spatial reception parameters; and to receive multiple indication signals transmitted from M spatial directions from the base station, where each indication signal corresponds to a spatial direction and has a spatial reception parameter;

a spatial direction determination module 73, adapted to determine the M spatial directions according to the multiple indication signals; and a slot determination module 74, adapted to, in the M spatial directions, determine slots occupied by the base station in each spatial direction respectively according to the starting position in the PDCCH of the slots indicated by the slot format and the number N of the slots indicated by the slot format; where M is a positive integer and N is a positive integer.

In some embodiments, the slot format indication index is a slot format indication index in a single spatial direction, and the slot determination module may include: a first space slot determination sub-module, adapted to, in a first spatial direction, determine an ending position of the slots indicated by the slot format in the first spatial direction according to the starting position in the PDCCH of the slots indicated by the slot format and the number N of the slots indicated by the slot format; a second space slot determination sub-module, adapted to, in a second spatial direction, take the ending position of the slots indicated by the slot format in the first spatial direction as a starting position of the slots indicated by the slot format in the PDCCH in the second spatial direction, and determine an ending position of the slots indicated by the slot format in the second spatial direction according to the number N of the slots indicated by the slot format; and an M-th space slot determination sub-module, adapted to, in an M-th spatial direction, take an ending position of the slots indicated by the slot format in an (M−1)th spatial direction as a starting position of the slots indicated by the slot format in the M-th spatial direction in the PDCCH, and determine an ending position of the slots indicated by the slot format in the M-th spatial direction according to the number N of the slots indicated by the slot format, sequentially, so as to determine slots occupied by the base station in each spatial direction.

In some embodiments, the slot format indication index may include multiple slot format indication indexes in M spatial directions, and the slot determination module may include: a multi-space slot determination sub-module, adapted to, in the M spatial directions, according to the starting position in the PDCCH of the slots indicated by the slot format and the number N of the slots indicated by the slot format, determine an ending position of the slots indicated by the slot format in each spatial direction, so as to determine slots occupied by the base station in each spatial direction.

In an embodiment, the indication signals may include downlink reference signals or SSB signals.

In an embodiment, the device for determining occupied slots may further include: a frequency domain resource determination module, adapted to determine frequency domain resources of one or more following signals as frequency domain resources occupied by the base station in each spatial direction: the PDCCH, a PDSCH scheduled by the PDCCH and the indication signals.

In an embodiment, the spatial direction determination module may include: a first correspondence determination sub-module, adapted to receive a high-level signaling from the base station, where the high-level signaling indicates a corresponding relationship between each indication signal and the spatial directions; and a first spatial direction determination sub-module, adapted to determine the M spatial directions according to the indication signals and the corresponding relationship.

In an embodiment, the spatial direction determination module may include: a second correspondence determination sub-module, adapted to receive a high-level signaling from the base station, where the high-level signaling indicates a one-to-one corresponding relationship between each indication signal and each spatial direction; and a second spatial direction determination sub-module, adapted to determine the M spatial directions according to the indication signals and the one-to-one corresponding relationship.

Principles, detailed implementation and advantages of the device for determining occupied slots can be found in the above descriptions of the method for determining occupied slots as shown in FIG. 1 to FIG. 6, and are not described here.

In an embodiment of the present disclosure, a storage medium having computer instructions stored therein is provided, wherein when the computer instructions are executed, the above method for determining occupied slots as shown in FIG. 1 to FIG. 6 is performed. The storage medium may be a computer readable storage medium, for example, including a non-volatile or non-transitory memory, an optical disk, a mechanical disk, a solid disk or the like.

In an embodiment of the present disclosure, a user equipment including a memory and a processor is provided, wherein the memory has computer instructions stored therein, and when the processor executes the computer instructions, the above method for determining occupied slots as shown in FIG. 1 to FIG. 6 is performed. The user equipment may include but not limited to a mobile phone, a computer or a tablet computer.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for determining occupied slots, comprising:
receiving a slot format indication index and a number N of slots indicated by a slot format from a base station through a physical downlink control channel (PDCCH), and determining a starting position in the PDCCH of the slots indicated by the slot format according to the slot format indication index;
receiving a number M of spatial directions from the base station, where different spatial directions have different spatial reception parameters, and receiving multiple indication signals transmitted from M spatial directions from the base station, where each indication signal corresponds to a spatial direction and has a spatial reception parameter;
determining the M spatial directions according to the multiple indication signals; and
in the M spatial directions, determining slots occupied by the base station in each spatial direction respectively, according to the starting position in the PDCCH of the slots indicated by the slot format and the number N of the slots indicated by the slot format; and
wherein M is a positive integer and N is a positive integer;
wherein the slot format indication index comprises a slot format indication index in a single spatial direction; and said in the M spatial directions, determining slots occupied by the base station in each spatial direction respectively according to the starting position in the PDCCH of the slots indicated by the slot format and the number N of the slots indicated by the slot format comprises:
in a first spatial direction, determining an ending position of the slots indicated by the slot format in the first spatial direction according to the starting position in the PDCCH of the slots indicated by the slot format and the number N of the slots indicated by the slot format;
in a second spatial direction, taking the ending position of the slots indicated by the slot format in the first spatial direction as a starting position of the slots indicated by the slot format in the PDCCH in the second spatial direction, and determining an ending position of the slots indicated by the slot format in the second spatial direction according to the number N of the slots indicated by the slot format; and
in an M-th spatial direction, taking an ending position of the slots indicated by the slot format in an (M−1)th spatial direction as a starting position of the slots indicated by the slot format in the M-th spatial direction in the PDCCH, and determining an ending position of the slots indicated by the slot format in the M-th spatial direction according to the number N of the slots indicated by the slot format, sequentially, so as to determine slots occupied by the base station in each spatial direction.

2. The method for determining occupied slots according to claim 1, wherein the indication signals comprise downlink reference signals or single side band signals.

3. The method for determining occupied slots according to claim 1, further comprising:
determining frequency domain resources of one or more following signals as frequency domain resources occupied by the base station in each spatial direction: the PDCCH, a Physical Downlink Shared Channel (PDSCH) scheduled by the PDCCH and the indication signals.

4. The method for determining occupied slots according to claim 1, wherein determining the M spatial directions according to the multiple indication signals comprises:
receiving a high-level signaling from the base station, where the high-level signaling indicates a corresponding relationship between each indication signal and the multiple indication signals; and
determining the M spatial directions according to the multiple indication signals and the corresponding relationship.

5. The method for determining occupied slots according to claim 1, wherein a number of the multiple indication signals is M, and determining the M spatial directions according to the multiple indication signals comprises:
receiving a high-level signaling from the base station, where the high-level signaling indicates a one-to-one corresponding relationship between each indication signal and each indication signal; and
determining the M spatial directions according to the multiple indication signals and the one-to-one corresponding relationship.

6. A device for determining occupied slots, comprising:
an index receiving circuitry, adapted to receive a slot format indication index and a number N of slots indicated by a slot format from a base station through a PDCCH, and determine a starting position in the PDCCH of the slots indicated by the slot format according to the slot format indication index;
an indication signal receiving circuitry, adapted to receive a number M of spatial directions from the base station, where different spatial directions have different spatial reception parameters; and to receive multiple indication signals transmitted from M spatial directions from the base station, where each indication signal corresponds to a spatial direction and has a spatial reception parameter;
a spatial direction determination circuitry, adapted to determine the M spatial directions are according to the multiple indication signals; and
a slot determination circuitry, adapted to, in the M spatial directions, determine slots occupied by the base station in each spatial direction separately according to the starting position in the PDCCH of the slots indicated by the slot format and the number N of the slots indicated by the slot format; and
wherein M is a positive integer and N is a positive integer;
wherein the slot format indication index comprises a slot format indication index in a single spatial direction, and the slot determination circuitry is further adapted to:
in a first spatial direction, determine an ending position of the slots indicated by the slot format in the first spatial direction according to the starting position in the PDCCH of the slots indicated by the slot format and the number N of the slots indicated by the slot format;
in a second spatial direction, take the ending position of the slots indicated by the slot format in the first spatial direction as a starting position of the slots indicated by the slot format in the PDCCH in the second spatial direction, and determine an ending position of the slots indicated by the slot format in the second spatial direction according to the number N of the slots indicated by the slot format; and
in an M-th spatial direction, take an ending position of the slots indicated by the slot format in an (M−1)th spatial direction as a starting position of the slots indicated by the slot format in the M-th spatial direction in the PDCCH, and determine an ending position of the slots indicated by the slot format in the M-th spatial direction according to the number N of the slots indicated by the slot format, sequentially, so as to determine slots occupied by the base station in each spatial direction.

7. A storage medium having computer instructions stored therein, wherein once the computer instructions are executed, the method according to claim 1 is performed.

8. A user equipment comprising a memory and a processor, wherein the memory has computer instructions stored therein, and when the processor executes the computer instructions, the method according to claim 1 is performed.

* * * * *